United States Patent
Kamiyama et al.

(10) Patent No.: US 7,402,030 B2
(45) Date of Patent: Jul. 22, 2008

(54) APPARATUS FOR EVERTING A LINING MATERIAL

(75) Inventors: Takao Kamiyama, Hiratsuka (JP); Koji Kaneta, Hiratsuka (JP); Kenji Fujii, Hiratsuka (JP); Ryoichi Goto, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 128 days.

(21) Appl. No.: 11/319,108

(22) Filed: Dec. 27, 2005

(65) Prior Publication Data

US 2006/0159791 A1    Jul. 20, 2006

(30) Foreign Application Priority Data

Dec. 28, 2004 (JP) ............................. 2004-379055
Dec. 1, 2005 (JP) ............................. 2005-347430

(51) Int. Cl.
*B29C 31/04* (2006.01)

(52) U.S. Cl. .......................... 425/11; 425/13; 156/287; 156/294; 138/97

(58) Field of Classification Search .................. 425/11, 425/13, 135, 145, 169, 214, 503, 500; 156/287, 156/294, 423; 264/36.17; 138/97
See application file for complete search history.

(56) References Cited

U.S. PATENT DOCUMENTS

| | | | | |
|---|---|---|---|---|
| 4,077,610 A | * | 3/1978 | Masuda | 254/134.4 |
| 4,368,091 A | * | 1/1983 | Ontsuga et al. | 156/287 |
| 4,385,885 A | * | 5/1983 | Wood | 425/387.1 |
| 4,427,480 A | * | 1/1984 | Kamuro et al. | 156/287 |
| 4,948,452 A | * | 8/1990 | Morinaga et al. | 156/382 |
| 5,358,359 A | * | 10/1994 | Long, Jr. | 405/184.2 |
| 5,374,174 A | * | 12/1994 | Long, Jr. | 425/11 |
| 5,906,789 A | * | 5/1999 | Kamiyama et al. | 264/516 |
| 6,050,300 A | * | 4/2000 | Schwert et al. | 138/98 |
| 6,390,795 B1 | * | 5/2002 | Waring et al. | 425/11 |
| 6,960,313 B2 | * | 11/2005 | Waring et al. | 264/36.17 |
| 2003/0209823 A1 | * | 11/2003 | Waring et al. | 264/36.17 |

* cited by examiner

*Primary Examiner*—Steven P. Griffin
*Assistant Examiner*—Seyed Masoud Malekzadeh
(74) *Attorney, Agent, or Firm*—Adams & Wilks

(57) ABSTRACT

An apparatus is provided for everting a tubular pipe lining material for rehabilitating an existing pipe. The apparatus has a sealed storage container storing a rotary body around which the pipe lining material is wound in a roll. An electric motor undergoes rotation in a first rotational direction to rotate the rotary body to wind the pipe lining material on the rotary body and undergoes rotation in a second rotational direction opposite to the first rotational direction. An eversion nozzle is attached to the storage container for everting the pipe lining material. When fluid pressure is supplied into the storage container to pull the pipe lining material out from the storage container and evert it via the eversion nozzle, the electric motor is caused to rotate in the second rotational direction due to the pulling out of the pipe lining material and to function as an electric generator to brake the pullout of the pipe lining material.

24 Claims, 10 Drawing Sheets

APPARATUS FOR EVERTING A LINING MATERIAL

BACKGROUND OF THE INVENTION

1. Field of the Invention

The present invention relates to an apparatus for everting a lining material, and more particularly relates to an apparatus for everting a tubular pipe lining material to repair a deteriorated existing pipe by lining the inner surface thereof.

2. Description of the Prior Art

A pipe lining method has been proposed and is already offered for practical application for cases in which an existing pipe, such as a sewer pipe, a gas pipe, a communication cable duct, an electric power cable duct, and the like, that is buried underground has deteriorated, wherein the existing pipe is repaired by lining the inner surface thereof without digging up the existing pipe.

As one example of the abovementioned pipe lining method, it is known to carry out construction using a pipe lining material made of a tubular resin adsorbing material impregnated with an unhardened liquid setting resin and with the outer surface thereof covered airtightly with a plastic film. With this construction method, a lining eversion apparatus is used to evert and insert a pipe lining material inside the pipeline by fluid pressure and, in a state wherein the pipe lining material is expanded by the fluid pressure and pressed against the inner surface of the pipeline, the setting resin impregnated in the pipe lining material is subsequently cured.

Normally, the pipe lining material is flattened and stored in a sealed container in a folded state. One end of the pipe lining material stored in this sealed container is bent outwardly, attached to the outer circumference of the open end of an eversion nozzle connected to the sealed container, and the lining material is inserted into the pipeline while everting it by the action of the fluid pressure inside the sealed container. Such a method is, for example, disclosed in Japanese Published Patent Application No. 2003-165158.

Nevertheless, the conventional lining material eversion apparatus has a disadvantage in that the pullout resistance during eversion is large and thus requires a large eversion pressure because the pipe lining material is stored so that it is folded in the storage container prior to eversion.

In addition, there is a problem during the pullout in that the pipe lining material of the folded upper part fluctuates vertically with the amount of pullout because the pipe lining material is stored folded, and the pullout is consequently not performed smoothly.

It is therefore an object of the present invention to provide an apparatus for everting a lining material capable of smoothly everting a pipe lining material with little pullout resistance during its eversion.

SUMMARY OF THE INVENTION

In accordance with the invention, an apparatus for everting a tubular pipe lining material for rehabilitating an existing pipe comprises a sealed storage container with a rotary body stored therein, the pipe lining material being wound on the rotary body in a roll; an electric motor for rotating the rotary body to wind the pipe lining material on said rotary body; and an eversion nozzle attached to said storage container for everting the pipe lining material; wherein fluid pressure is applied into said storage container to pull the pipe lining material out from the storage container and evert it via the eversion nozzle, said electric motor being caused to rotate in reverse due to the pulling out of the pipe lining material and function as an electric generator to brake the pullout of the pipe lining material.

In the present invention, the electrical energy generated when the electric motor functions as an electric generator is accumulated by returning it to a power supply that drives the electric motor. In addition, a sensor is provided that detects the rotational speed of the rotary body or the pullout speed of the pipe lining material to adjust the fluid pressure in accordance with the detected speed.

In the present invention, after a prescribed amount of the pipe lining material is wound around the rotary body, it is wound around an adjacent side part on the same rotary body and stored in the storage container; and when pulling the pipe lining material out from the storage container, the later wound pipe lining material is pulled out and then the earlier wound pipe lining material is pulled out.

In the invention, the pipe lining material is connected on the side opposite the eversion nozzle to a hose that is wound around the rotary body. The hose is unwound from the rotary body by the pullout of the pipe lining material to brake the pullout of the pipe lining material after the pipe lining material is unwound from the rotary body and removes therefrom. The hose is used to supply a heat medium for heating the everted pipe lining material.

According to the present invention, the pullout speed of the pipe lining material is substantially constant, the pullout resistance is small, and it is possible to smoothly evert the pipe lining material because it is wound around the rotary body by the electric motor, which functions as an electric generator during eversion and brakes the pullout of the pipe lining material.

In addition, it is possible to extend the length of the pipe lining material stored in the storage container because the pipe lining material can be wound in a parallel arrangement in the storage container with the present invention.

Further features of the invention, its nature and various advantages will be more apparent from the accompanying drawings and following detailed description of the invention.

DETAILED DESCRIPTION OF THE PREFERRED EMBODIMENTS

The present invention is constituted so that a pipe lining material is wound around a rotary body, such as a reel, using an electric motor. When everting the pipe lining material, the electric motor is, however, operated as an electric generator and brakes the pullout of the pipe lining material.

The embodiments of the present invention will be explained in the following based on the attached drawings.

Figure 1:
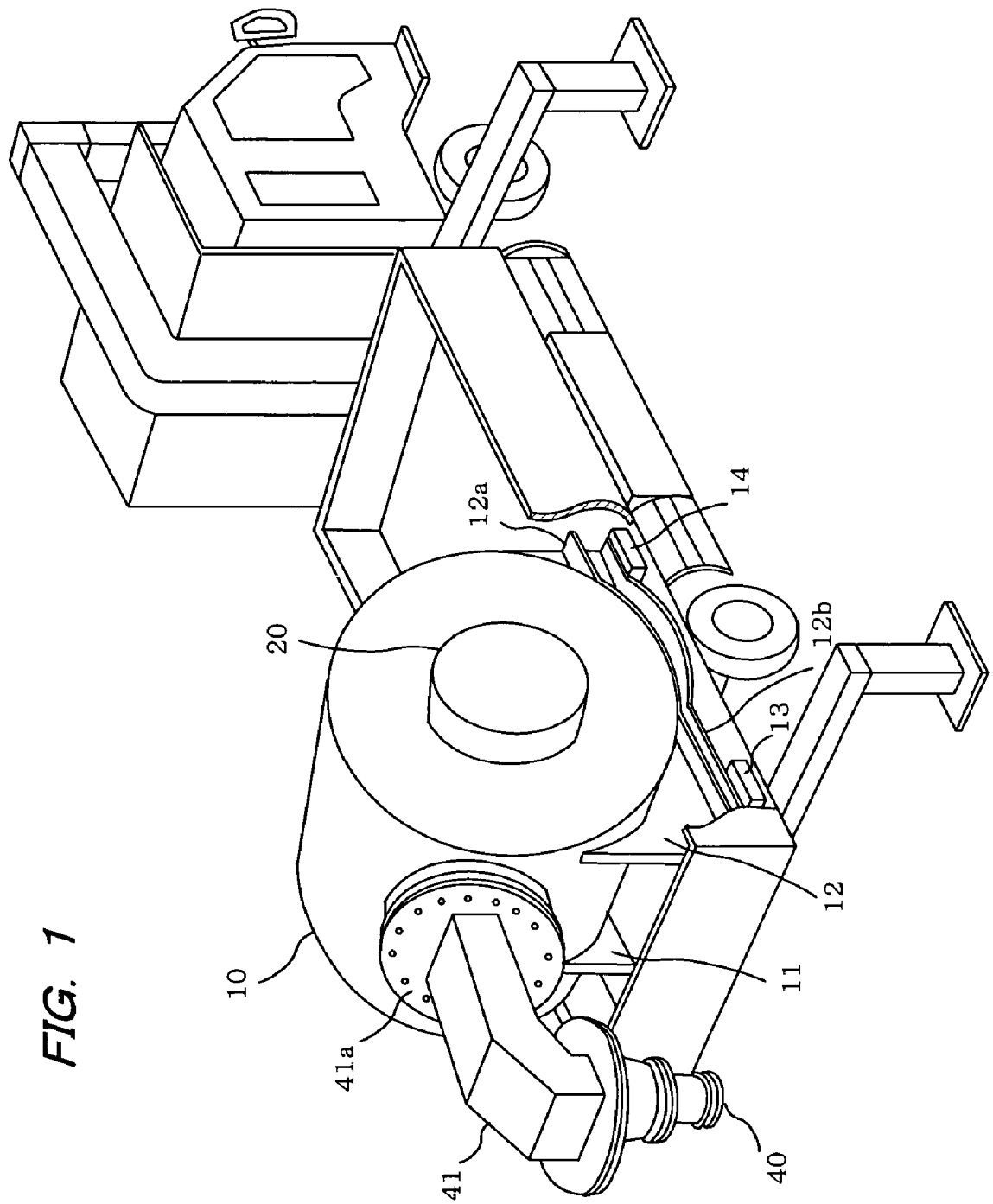
FIG. 1 is a schematic view showing a lining material eversion apparatus loaded on a track according to the present invention.
Figure 2:
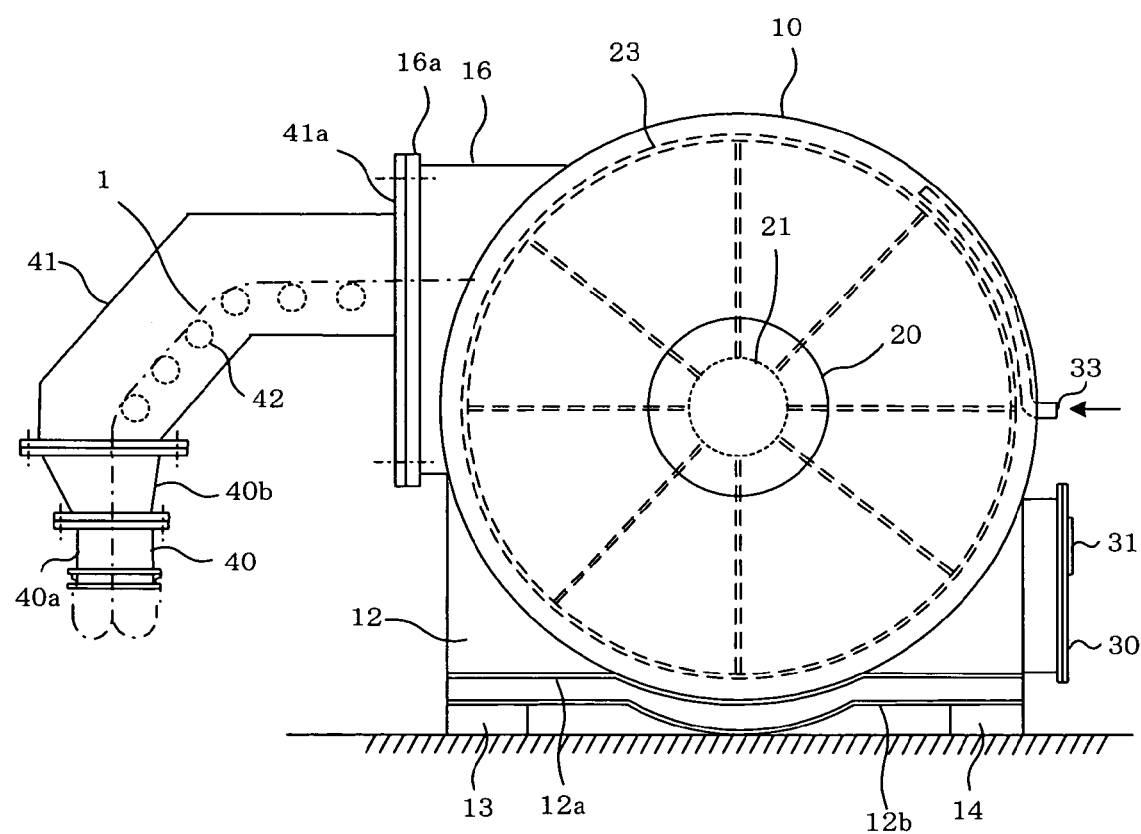
FIG. 2 is a front view of the lining material eversion apparatus.
Figure 3:
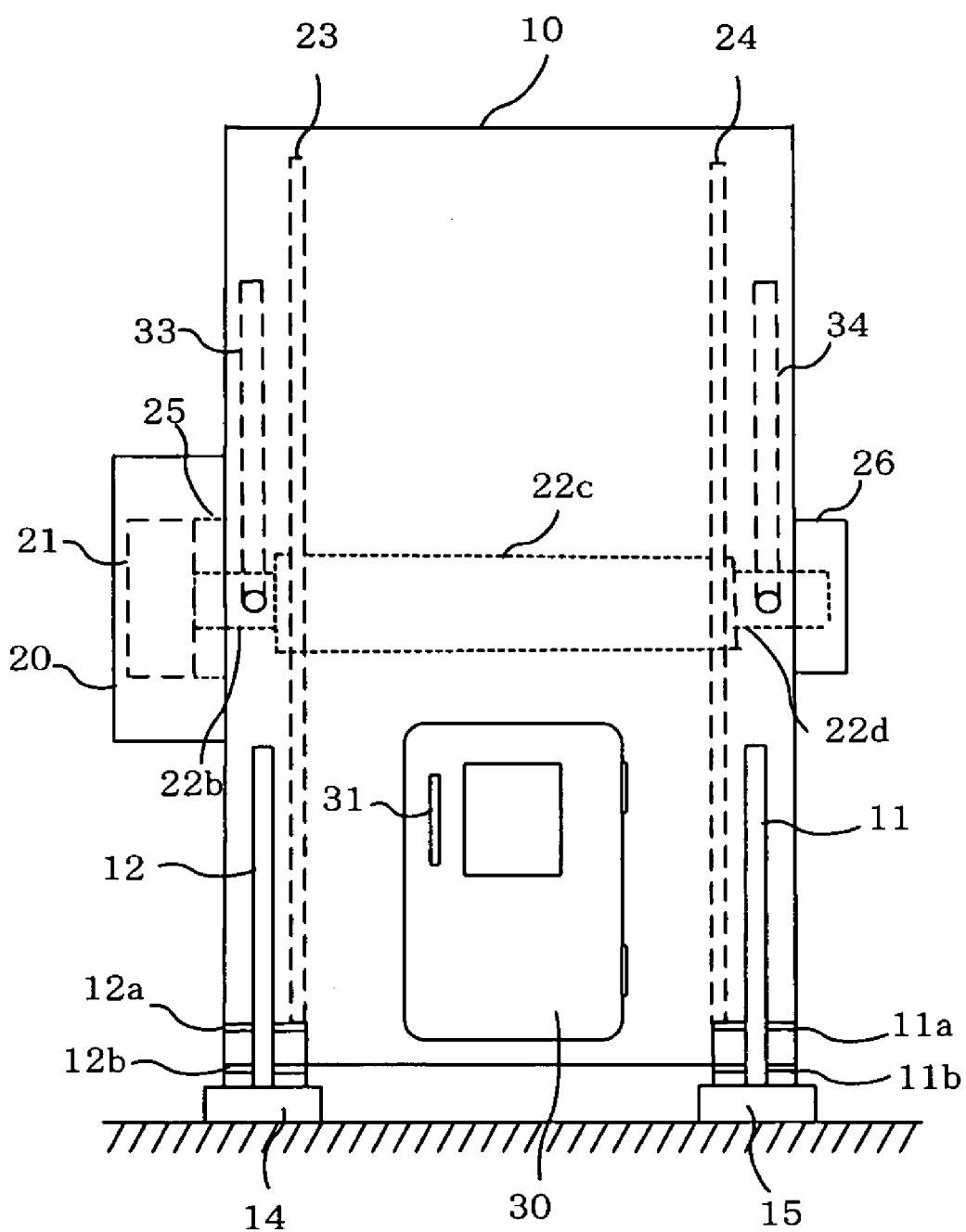
FIG. 3 is a side view of the lining material eversion apparatus.

FIG. 1 through FIG. 3 show the constitution of an apparatus for everting a lining material. Symbol 10 shows a storage container that stores the pipe lining material and has a sealed structure. Normally, as shown in FIG. 1, the storage container 10 is affixed to the platform of a track via support plates 11, 12, and moved to the work site. The support plate 12 is provided with rib structures 12a, 12b that extend horizontally to reinforce the support plate. The support plate 11 is also provided with similar rib structures 11a, 11b (FIG. 3). In addition, the four corners of the storage container 10 are provided with vertical adjustment mechanisms 13, 14, 15 (the remaining one cannot be seen, and is therefore not shown), which enable the storage container 10 to be held horizontally.

An eversion nozzle 40 is detachably attached to the storage container 10 via a conduit 41, which has a plurality of guide rollers 42. The eversion nozzle 40 comprises a cylindrical nozzle part 40a and a conical part 40b that is airtightly attached thereto. One end of the conduit 41 is likewise airtightly attached to this conical part 40b, and a flange 41a is fixed to the end part of the conduit 41 on the side opposite the eversion nozzle 40. The flange 41a and a flange 16a attached to a side pipe 16, which extends laterally from the storage container 10, are constituted so that they can be mutually and airtightly coupled via a fixing means, such as a plurality of bolts and nuts, and the eversion nozzle 40 thereby maintains a sealed structure via the conduit 41 when it is attached to the storage container 10.

Figure 4:
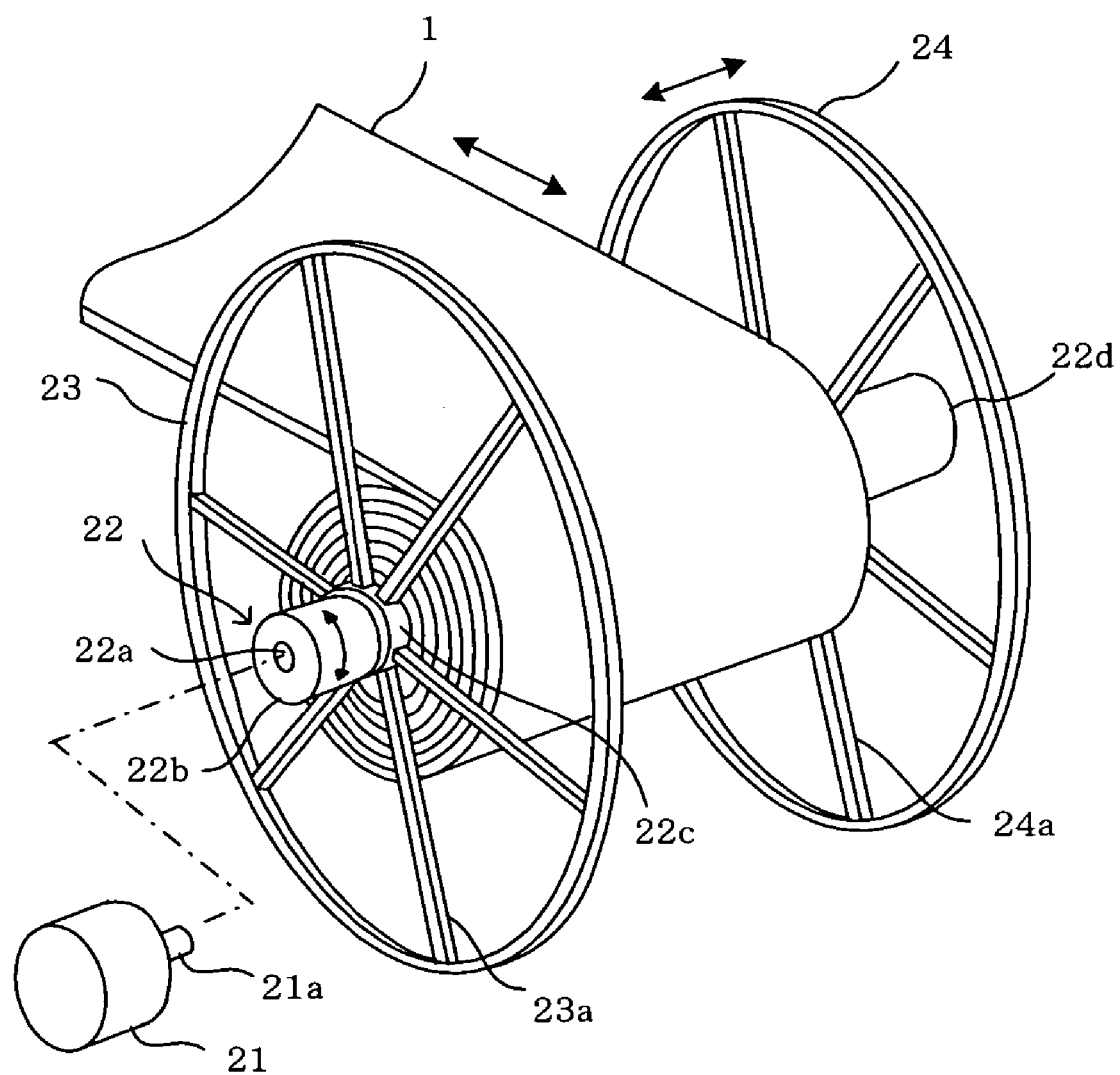
FIG. 4 is a schematic view showing the pipe lining material wound in a roll.

The storage container 10 includes a rotary body 22 such as a spool or a reel (explained below as a reel) that is rotatably supported on bearing parts 25, 26 provided at each side of the container 10. The reel 22 is used to wind a pipe lining material 1 in a roll and, as shown in FIG. 3 and FIG. 4, comprises small diameter shafts 22b, 22d, which are rotably supported around the bearing parts 25, 26, and a large diameter shaft 22c therebetween. A ring plate 23 having spokes 23a is fixed to one end of the large diameter shaft 22c and a ring plate 24 having spokes 24a is slidably attached to the other end thereof in the axial direction.

A coupling hole 22a is drilled in the small diameter shaft 22b of the reel 22, and a shaft 21a of a direct current electric motor 21 is coupled to the coupling hole 22a. The electric motor 21 is housed in a motor drive part 20. The reel 22 rotates in the clockwise direction, as viewed in FIG. 4, when the electric motor 21 is driven, and the pipe lining material 1 is thereby wound in a roll on the reel 22. At this time, the ring plate 24 is moved along the large diameter shaft 22c, and the position of the ring plate 24 is adjusted so that it is aligned with the wind-up width of the pipe lining material, thereby ensuring the reliable windup thereof.

When the pipe lining material 1 wound on the reel 22 is pulled out of the storage container and everted, as discussed later, the reel 22 rotates in reverse due to the torque acting on the reel 22. This causes the electric motor 21 to rotate in reverse and operate as an electric generator, thereby braking the pullout of the pipe lining material.

In addition, ducts 33, 34 are respectively attached to the left and right of the storage container 10 in order to feed to the storage container the fluid pressure (compressed air) for everting the pipe lining material 1. Furthermore, an openable and closable access door 30 is airtightly attached to the lower part of the storage container 10 and a worker can inspect the interior of the storage container 10 by opening the door by pulling on a handle 31.

Figure 8:
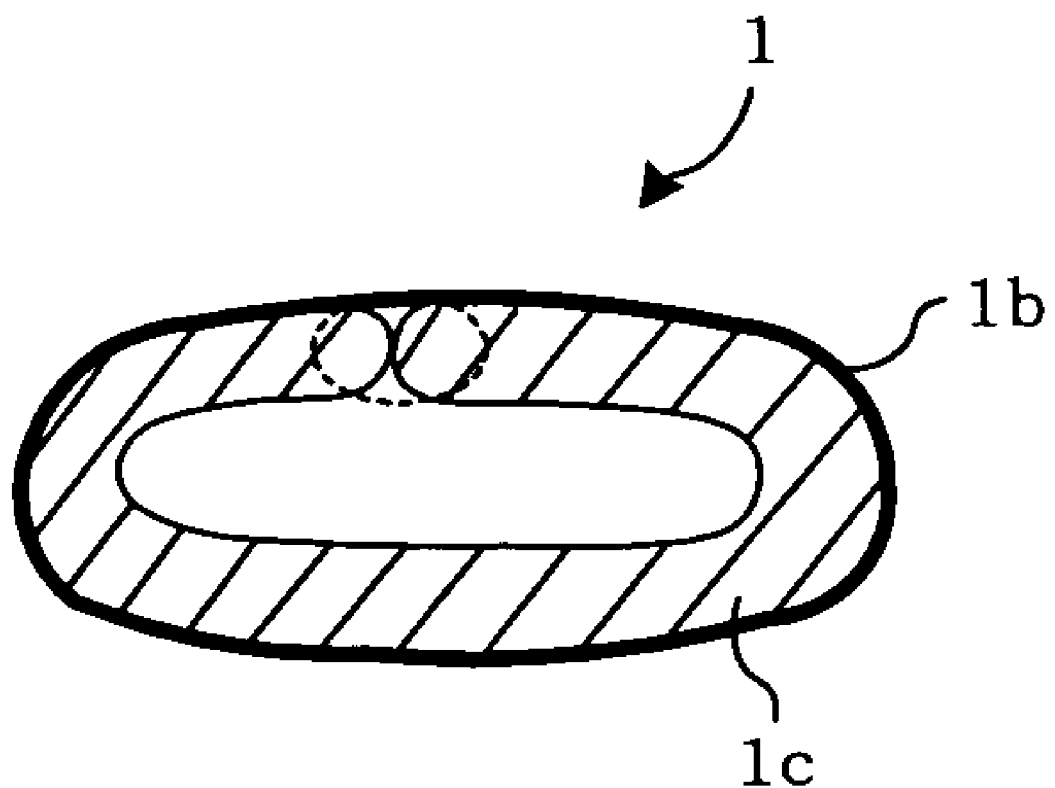
FIG. 8 is a transverse cross sectional view of the pipe lining material.

The pipe lining material 1 wound on the reel is a well-known pipe lining material and is constituted so that a tubular resin adsorbing material 1c with its outer surface airtightly covered by a plastic film 1b is impregnated with an uncured liquid setting resin, as shown in FIG. 8. A film, such as polyethylene, vinyl chloride, vinylon, polyurethane, nylon, polypropylene, and a polyethylene-nylon copolymer, is used as the plastic film 1b, and a nonwoven fabric, such as polyester, nylon, acrylic, and vinylon, is used as the tubular resin adsorbing material 1c. In addition, a thermosetting resin, such as unsaturated polyester resin and epoxy resin, is used as the uncured liquid setting resin impregnated in the tubular resin adsorbing material 1c.

Figure 5A:
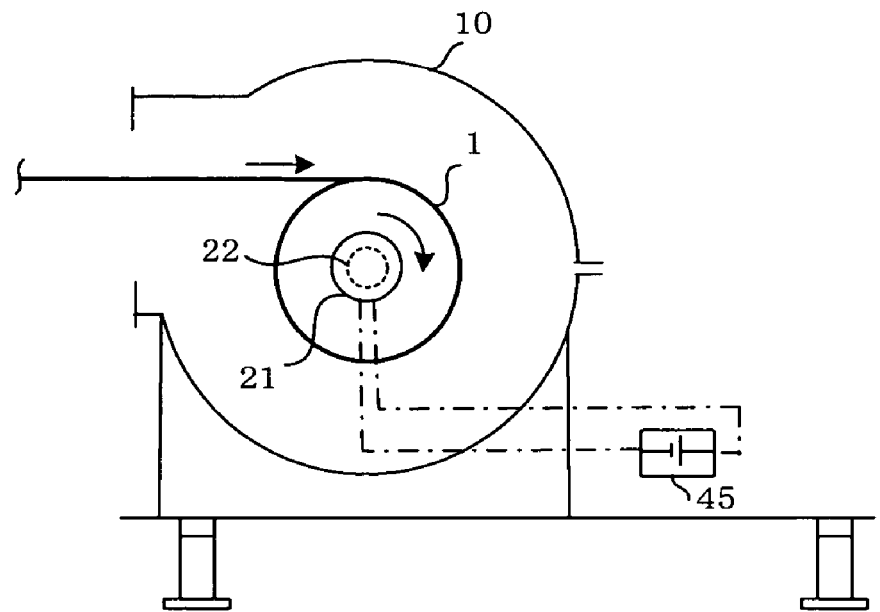
FIG. 5a is an explanatory view showing a process by which the pipe lining material is stored in the storage container.

With such a constitution, the eversion apparatus is normally loaded on a track. The pipe lining material 1 is stored in the storage container 10 by disconnecting the flange 41a of the conduit 41 from the flange 16a of the side pipe 16 of the storage container 10, and by removing the conduit 41 and the eversion nozzle 40 connected thereto from the storage container 10 using a crane (now shown). Then, as shown in FIG. 5a, one end of the pipe lining material 1 is fixed to the reel 22 through an opening, and a direct current power supply 45 is used to drive the electric motor 21. The reel 22 rotates in the clockwise direction (first rotational direction), and the pipe lining material 1 transitions to a flat state and is wound in a roll on the reel 22. The drive of the electric motor 21 stops when the pipe lining material 1 has wound to the point where its diameter is substantially the same as the diameter of the ring plates 23, 24.

Figure 5B:
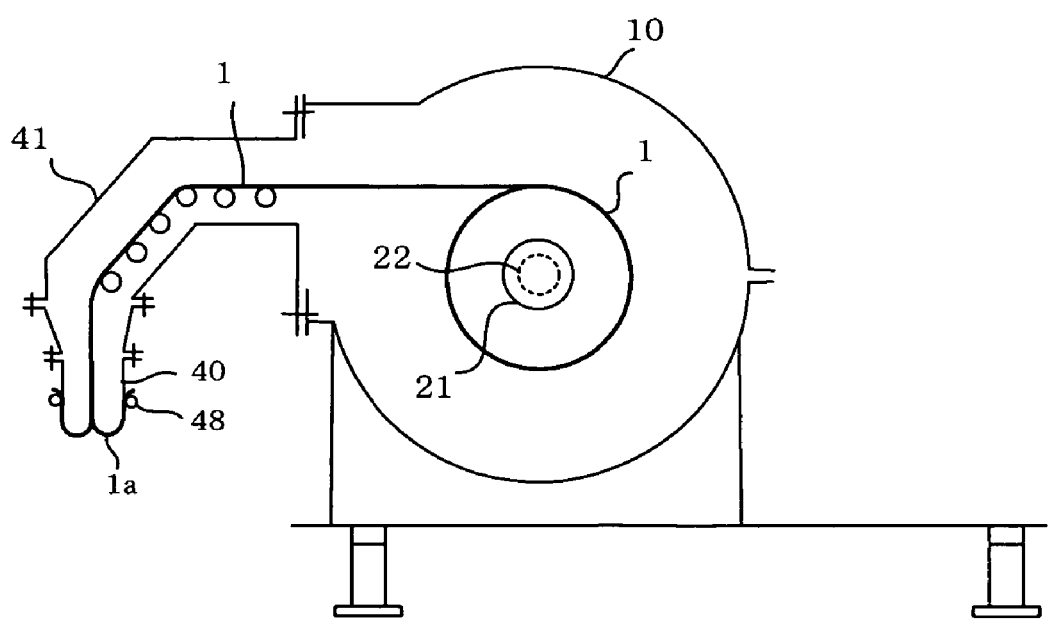
FIG. 5b is an explanatory view showing a process by which the pipe lining material is pulled out from the storage container.

Subsequently, as shown in FIG. 5b, the conduit 41 and the eversion nozzle 40 are attached to the storage container 10 by fixing the flanges 41a and 16a. Then, one end 1a of the pipe lining material 1 is guided near the opening of the eversion nozzle 40, folded back outwardly, as shown in the figure, and airtightly attached by a band 48 to the outer circumference of the open end of the eversion nozzle 40.

Such a storage of the pipe lining material 1 in the storage container 10, and the attachment of the pipe lining material 1 to the eversion nozzle 40 can be performed at the work site or at a stage before going to the work site.

Figure 6:
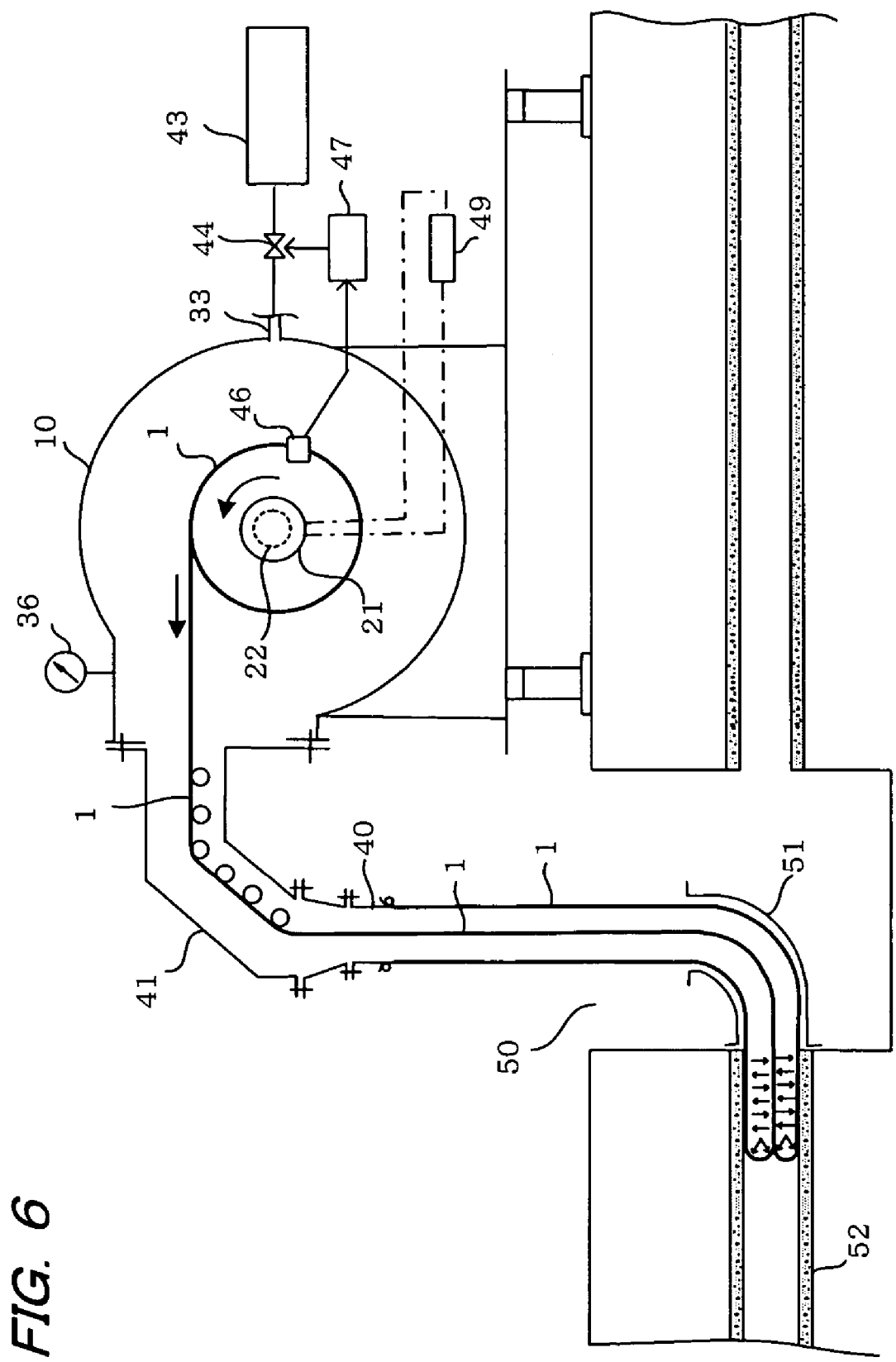
FIG. 6 is an explanatory view showing a state wherein the pipe lining material is everted and inserted in the existing pipe.

Such an eversion apparatus is used to rehabilitate an existing pipe, such as a sewer or a communication cable duct. For this purpose, the eversion apparatus is moved near a manhole 50, as shown in FIG. 6, and the eversion nozzle 40, loaded on the track as is, is disposed at a position facing the manhole 50 in a direction perpendicular thereto.

In that state, a compressed air supply 43 is driven, which supplies compressed air through a valve 44 into the storage container 10 via a duct 33 or 34. Because the storage container 10 is in a sealed state up to the conduit 41 and the eversion nozzle 40, and maintains airtightness as a whole, the compressed air acts upon the folded back part of the pipe lining material 1 attached to the eversion nozzle 40, and the pipe lining material 1 is thereby everted and moves into the manhole 50.

The pipe lining material 1 is unwound from the reel 22 and pulled out of the storage container 10 by the action of the fluid pressure (the compressed air pressure), and is everted by the eversion nozzle 40 and inserted into the manhole 50. At this time, the reel 22 rotates in reverse due to the pulling out of the pipe lining material, thereby rotating the shaft 21*a* of the electric motor 21 coupled to the reel 22 in the reverse direction (second rotational direction). The electric motor 21 then operates as an electric generator, thus braking the pullout of the pipe lining material 1. The electrical energy generated by the electric motor 21 is consumed by a load 49, such as a resistor. The electrical energy generated by the electric motor 21 may be returned to the power supply 45 for regenerative braking. In this case, the electric motor 21 is connected as needed to the power supply 45 via a resistor to reduce the torque in the windup direction of the electric motor 21, thereby preventing a loss in the pullout force of the pipe lining material 1.

Greater pullout speed of the pipe lining material 1 results in greater braking force. This feature enables the pipe lining material 1 to be pulled out at a substantially constant speed. However, the rotational speed of the ring plate 23 (or 24) may be measured by a speed sensor 46, as shown in FIG. 6. The measured speed is used to vary the amount by which the valve 44 is throttled by an actuator 47 or used to adjust the amount of compressed air introduced into the storage container 10 for pressure adjustment. When, for example, the rotational speed becomes greater than a prescribed value, the valve 44 is throttled to reduce the amount of compressed air, thereby also enabling the rotational speed to be reduced. In addition, it is possible to adjust the compressed air pressure by adjusting the amount by which the valve 44 is throttled in accordance with the pressure of a barometer 36, which may be attached to the storage container 10.

As discussed above, compressed air is supplied into the storage container 10. The pipe lining material 1 then drops into the manhole 50 while everting, changes to the horizontal direction by a bent pipe 51, and is sequentially inserted into an existing pipe 52. The pipe lining material 1, which was everted and inserted into the existing pipe 52, is then heated by hot water or steam, and the like, and the heat thereby cures the thermosetting resin impregnated in the pipe lining material 1, thus lining and repairing the inner surface of the existing pipe 52 by the hardened pipe lining material 1.

The wind up width of the pipe lining material 1 depends upon the pipe diameter of the existing pipe to be repaired, and doesn't become as large as the full width of the rail as shown in FIG. 4, if the pipe diameter is small. Therefore, as shown in FIG. 7, the pipe lining material 1 may be wound in a dual parallel arrangement on the rail.

Figure 7:
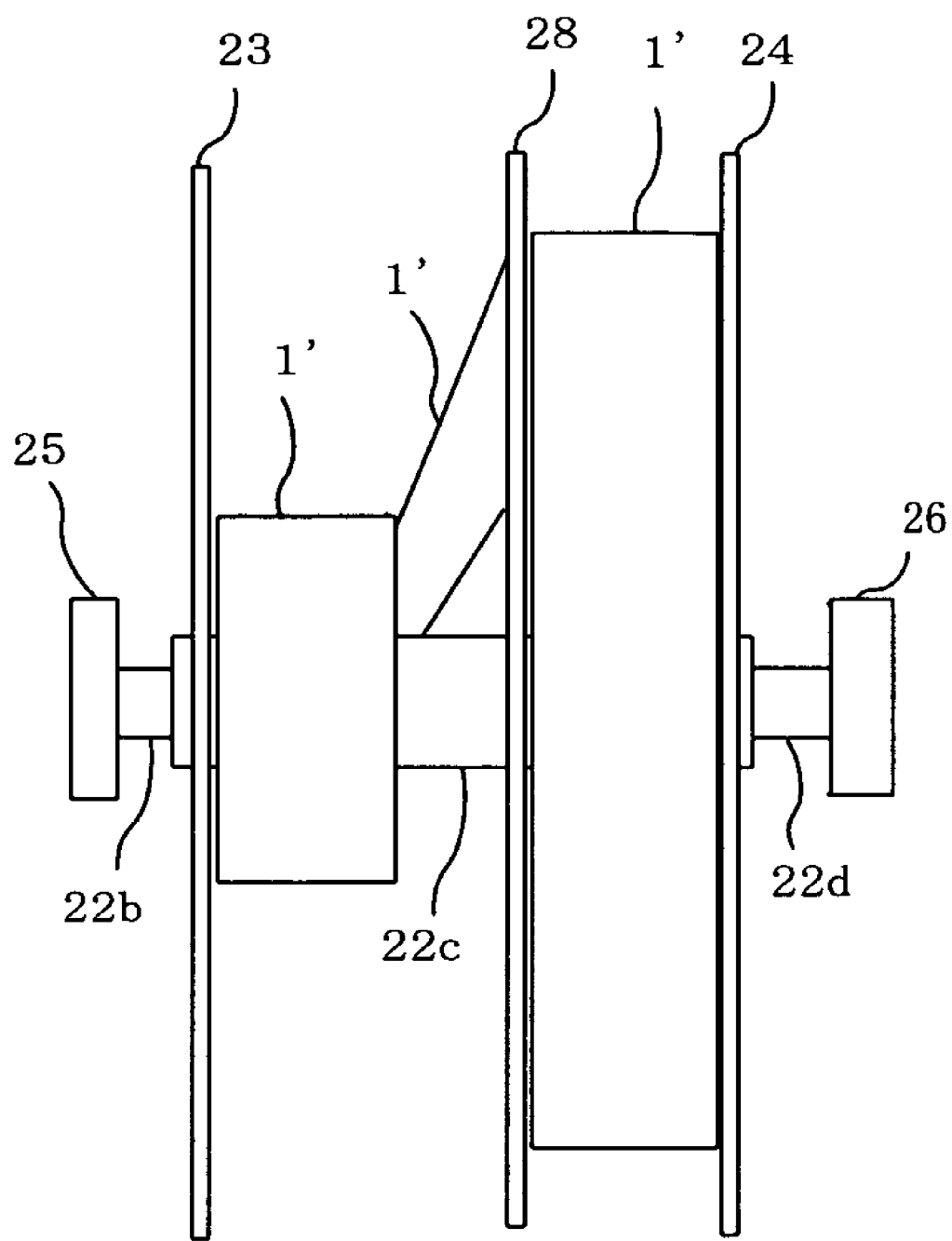
FIG. 7 is a side view showing a state wherein the pipe lining material is wound in a parallel arrangement.

With the constitution in FIG. 7, a ring plate 28 having the same constitution as the ring plates 23, 24 is provided. A pipe lining material 1' is wound between the ring plate 24 and a ring plate 28 (i.e. a first part of the rotary body 22) until the winding diameter reaches substantially the diameter of the ring plates, and is then moved to the immediate left and wound against the ring plate 23 ((i.e., a second part of the rotary body 22). The left side pipe lining material 1' is first pulled out, and, when all of that has been pulled out, then the pipe lining material 1' wound on the right side is pulled out. The amount of pipe lining material stored in the storage container 10 can be increased by such a constitution.

Figure 9A:
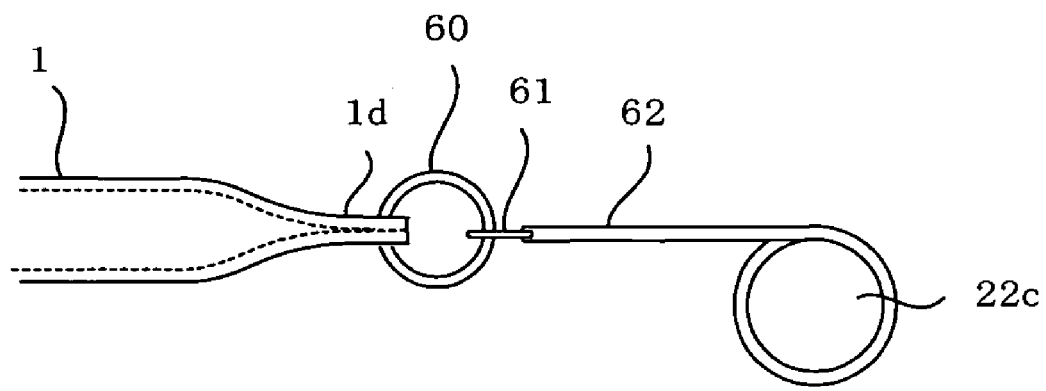
FIG. 9a is a side view showing an example wherein a hose is coupled to the end part of the pipe lining material.
Figure 9B:
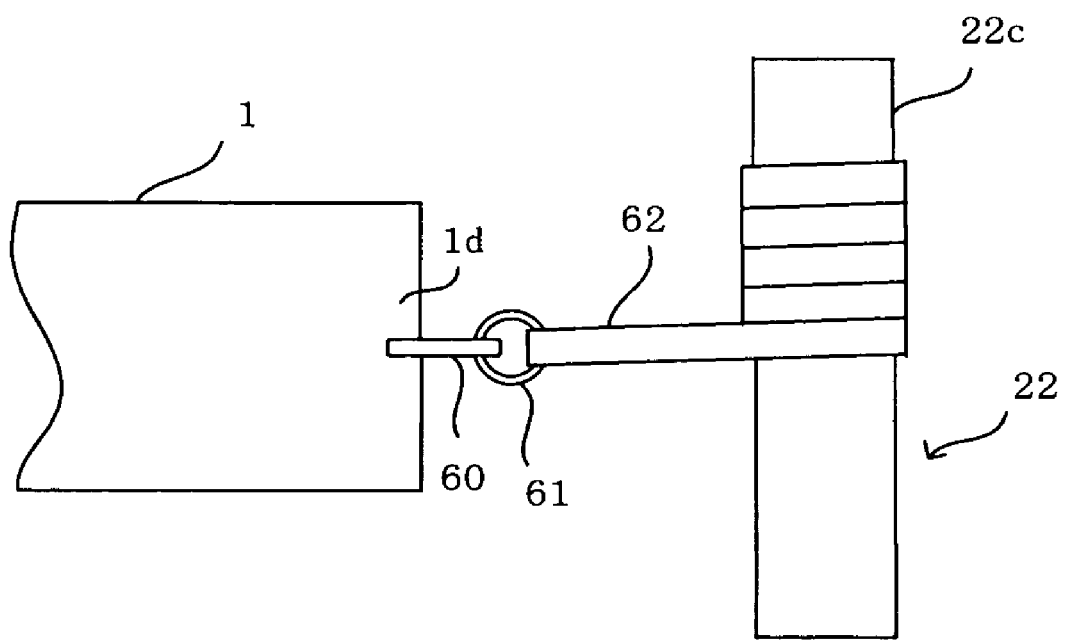
FIG. 9b is a top view thereof.

FIG. 9 shows another embodiment. The pipe lining material 1 shown in FIG. 8 is airtightly sealed on the side opposite the eversion nozzle, and a hose 62 is coupled through coupling fixtures 60, 61 to an end part 1*d* on the side opposite this pipe lining material 1 in order to supply a heat medium, such as hot water and steam. The hose 62 is wound around the large diameter shaft 22*c* of the reel 22 by the electric motor 21; the pipe lining material 1 is then wound around the large diameter shaft 22*c* of the reel 22 after the hose 62 is wound.

With this embodiment, the entire pipe lining material 1 is unwound from the reel 22 when everting and inserting the pipe lining material 1. Even if the end part 1*d* of the pipe lining material 1 removes from the reel 22, the hose 62 coupled thereto is unwound. This causes the reel 22 to continue to rotate in the reverse direction, and the electric motor 21 still functions as an electric generator, which enables the pullout of the pipe lining material 1 to be braked.

Figure 10:
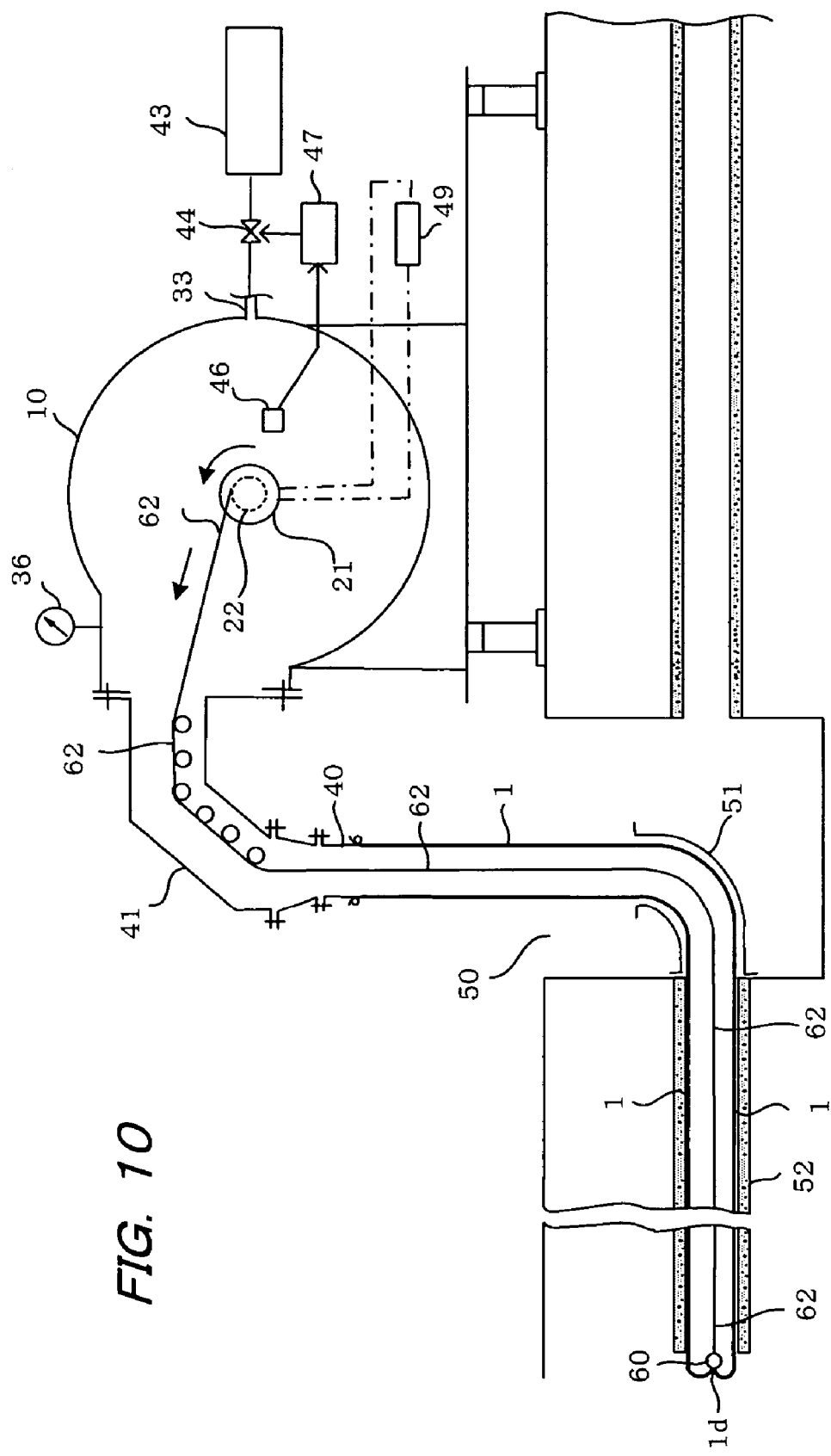
FIG. 10 is an explanatory view showing a state wherein the everted inversion of the pipe lining material into the existing pipe is complete.

FIG. 10 shows a state wherein the everted insertion of the pipe lining material 1 into the existing pipe 52 is complete. The pullout of the pipe lining material can be stabilized until that inverted insertion is completed because the unwinding of the hose 62 continues until the end part 1*d* of the pipe lining material 1 reaches the final end part of the existing pipe 52. As shown in FIG. 10, the length of the hose 62 is designed so that the hose remains on the rotary body, i.e. the hose 62 is still wound around the reel 22 when the end part 1*d* of the pipe lining material 1 has reached the final end part of the existing pipe 52.

When the everted insertion of the pipe lining material 1 into the existing pipe 52 is complete, hot water or steam is supplied from the reel side of the hose 62 to heat and cure the thermosetting resin in the everted and inserted pipe lining material 1, thus completing the repair of the existing pipe 52. Furthermore, the curing of the pipe lining material 1 is performed by supplying hot water or steam from the tip of the hose 62, i.e., from the end part 1*d* of the pipe lining material 1. Alternatively, the pipe lining material 1 may be cured by providing the hose 62 with a plurality of spray ports and either spraying a mist of hot water or steam from these spray ports, or showering the hot water from the spray ports.

What is claimed is:

1. An apparatus for everting a tubular pipe lining material for rehabilitating an existing pipe, the apparatus comprising:
    a sealed storage container storing a rotary body around which the pipe lining material is wound in a roll;
    an electric motor for undergoing rotation in a first rotational direction to rotate the rotary body to wind the pipe lining material on the rotary body and for undergoing rotation in a second rotational direction opposite to the first rotational direction; and
    an eversion nozzle attached to the storage container for everting the pipe lining material;
    wherein when fluid pressure is supplied into the storage container to pull the pipe lining material out from the storage container and evert it via the eversion nozzle, the electric motor is caused to rotate in the second rotational direction due to the pulling out of the pipe lining material and to function as an electric generator to brake the pullout of the pipe lining material.

2. An apparatus according to claim 1; further comprising a power supply for rotationally driving the electric motor; and wherein when the electric motor functions as an electric generator, electrical energy is accumulated and returned to the power supply for rotationally driving the electric motor.

3. An apparatus according to claim 1; further comprising a sensor that detects one of a rotational speed of the rotary body and a pullout speed of the pipe lining material to adjust the fluid pressure applied into the storage container in accordance with the detected rotational or pullout speed.

4. An apparatus according to claim 1; wherein the rotary body has a first part around which a prescribed amount of the pipe lining material is wound and a second part around which a remaining amount of the pipe lining material is wound after the prescribed amount of the pipe lining material is wound around the first part; and wherein when the pipe lining material is pulled out from the storage container, the remaining amount of the wound pipe lining material is first pulled out and then the prescribed amount of the wound pipe lining material is pulled out.

5. An apparatus according to claim 1; further comprising a hose wound around the rotary body and connected to an end of the pipe lining material opposite to an end thereof disposed adjacent to the eversion nozzle; wherein the hose is unwound from the rotary body by the pullout of the pipe lining material to brake the pullout of the pipe lining material after the pipe lining material is unwound from the rotary body and removed therefrom.

6. An apparatus according to claim 5; further comprising means for supplying a heat medium via the hose for heating the everted pipe lining material.

7. An apparatus according to claim 1; further comprising means for supplying fluid pressure into the storage container to pull the pipe lining material out from the storage container and evert it via the eversion nozzle.

8. An apparatus according to claim 3; wherein the sensor detects the rotational speed of the rotary body.

9. An apparatus according to claim 3; wherein the sensor detects the pullout speed of the pipe lining material.

10. An apparatus comprising:
a sealed storage container for receiving fluid pressure;
a rotary body disposed in the sealed storage container and around which a tubular pipe lining material is wound, the pipe lining material being unwound from the rotary body and pulled out from the sealed storage container by supplying fluid pressure into the sealed storage container; and
an electric motor for undergoing rotation in a first rotational direction to rotate the rotary body to wind the pipe lining material on the rotary body, and for undergoing rotation in a second rotational direction opposite to the first rotational direction due to the pulling out of the pipe lining material when the fluid pressure is supplied into the sealed storage container so that the electric motor functions as an electric generator to brake the pullout of the pipe lining material.

11. An apparatus according to claim 10; further comprising an eversion nozzle connected to the sealed storage container for everting the pipe lining material when fluid pressure is supplied into the sealed storage container and the pipe lining material is unwound from the rotary body and pulled out from the sealed storage container.

12. An apparatus according to claim 11; further comprising means for supplying fluid pressure into the sealed storage container to unwind the pipe lining material from the rotary body, pullout the pipe lining material out from the sealed storage container, and evert the pipe lining material via the eversion nozzle.

13. An apparatus according to claim 10; further comprising means for supplying fluid pressure into the sealed storage container to unwind the pipe lining material from the rotary body and pullout the pipe lining material out from the sealed storage container.

14. An apparatus according to claim 10; further comprising a power supply for rotationally driving the electric motor; and wherein when the electric motor rotates in the second rotational direction to brake the pullout of the pipe lining material, electrical energy is accumulated and returned to the power supply for rotationally driving the electric motor.

15. An apparatus according to claim 10; further comprising a sensor that detects one of a rotational speed of the rotary body and a pullout speed of the pipe lining material to adjust the fluid pressure applied into the sealed storage container in accordance with the detected rotational or pullout speed.

16. An apparatus according to claim 15; wherein the sensor detects the rotational speed of the rotary body.

17. An apparatus according to claim 15; wherein the sensor detects the pullout speed of the pipe lining material.

18. An apparatus according to claim 10; wherein the rotary body has a first part around which a prescribed amount of the pipe lining material is wound and a second part around which a remaining amount of the pipe lining material is wound after the prescribed amount of the pipe lining material is wound around the first part; and wherein when the pipe lining material is pulled out from the sealed storage container, the prescribed amount of the wound pipe lining material is pulled out from the sealed storage container after the remaining amount of the wound pipe lining material is pulled out completely from the sealed storage container.

19. An apparatus according to claim 1; further comprising a hose wound around the rotary body and connected to an end of the pipe lining material; wherein when the pipe lining material is unwound from the rotary body during pullout out thereof from the sealed storage container, the hose is unwound from the rotary body and brakes the pullout of the pipe lining material.

20. An apparatus according to claim 19; further comprising an eversion nozzle connected to the sealed storage container for everting the pipe lining material when fluid pressure is supplied into the sealed storage container and the pipe lining material is unwound from the rotary body and pulled out from the sealed storage container; and means for supplying a heat medium via the hose for heating the everted pipe lining material.

21. An apparatus comprising:
a storage container;
a rotary body disposed in the storage container and around which a tubular pipe lining material is wound so that the pipe lining material is capable of being unwound from the rotary body and pulled out from the storage container; and
an electric motor rotationally driven in a first rotational direction by electrical energy to rotate the rotary body to wind the pipe lining material on the rotary body, and being rotationally driven in a second rotational direction opposite to the first rotational direction by rotation of the rotary body caused by the pulling out of the pipe lining material so that the electric motor functions as an electric generator to brake the pullout of the pipe lining material.

22. An apparatus according to claim 21; further comprising an eversion nozzle connected to the storage container for everting the pipe lining material when the pipe lining material is unwound from the rotary body and pulled out from the storage container.

23. An apparatus according to claim 21; further comprising a power supply for rotationally driving the electric motor; and wherein when the electric motor rotates in the second rotational direction to brake the pullout of the pipe lining material, electrical energy is accumulated and returned to the power supply for rotationally driving the electric motor.

24. An apparatus according to claim 21; further comprising a sensor that detects one of a rotational speed of the rotary body and a pullout speed of the pipe lining material.

* * * * *